June 24, 1952  T. J. TUDOR  2,601,234
AUTOMOBILE DRIVE WHEEL POWER TAKE-OFF
Filed Aug. 17, 1951  2 SHEETS—SHEET 1
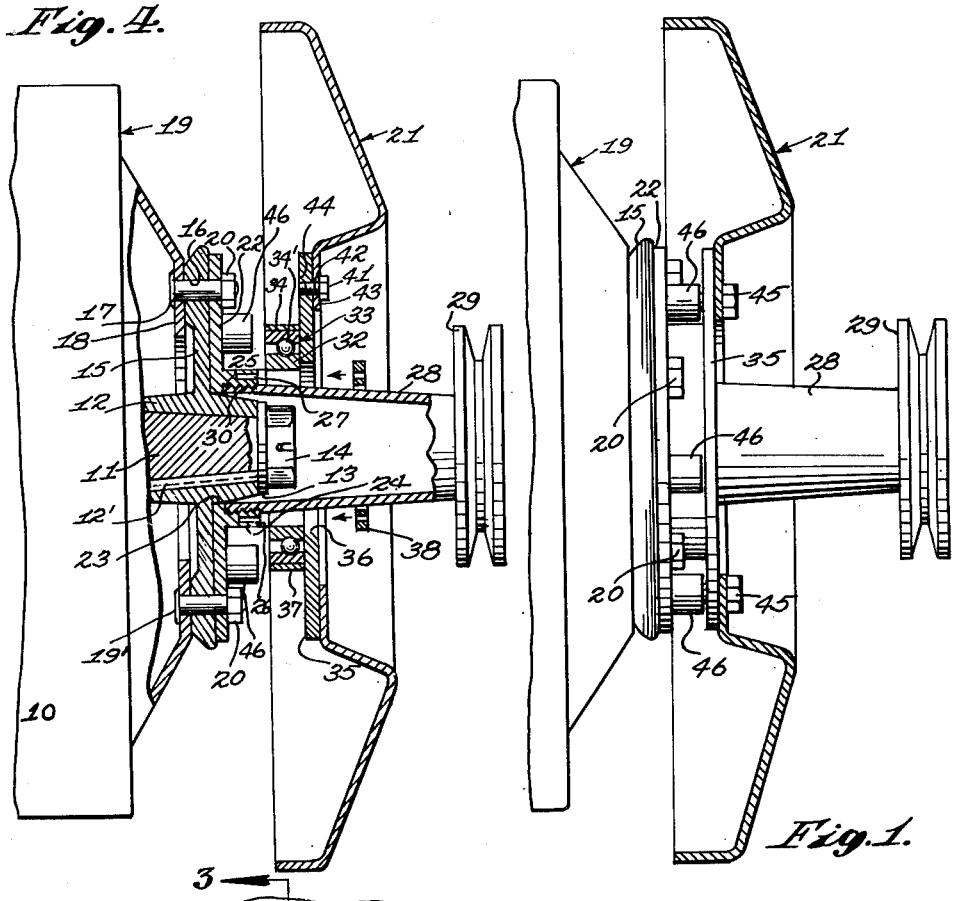
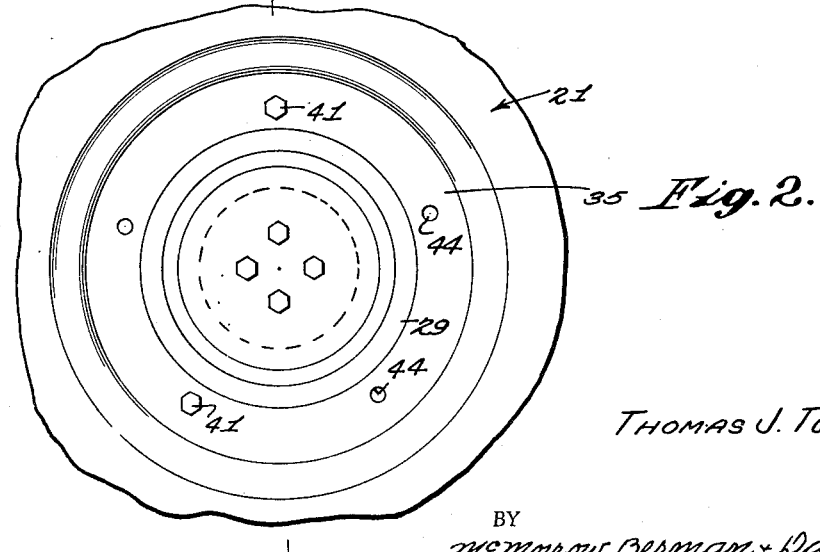
INVENTOR
THOMAS J. TUDOR
BY
McMorrow, Berman & Davidson
ATTORNEYS June 24, 1952 T. J. TUDOR 2,601,234
AUTOMOBILE DRIVE WHEEL POWER TAKE-OFF
Filed Aug. 17, 1951 2 SHEETS—SHEET 2
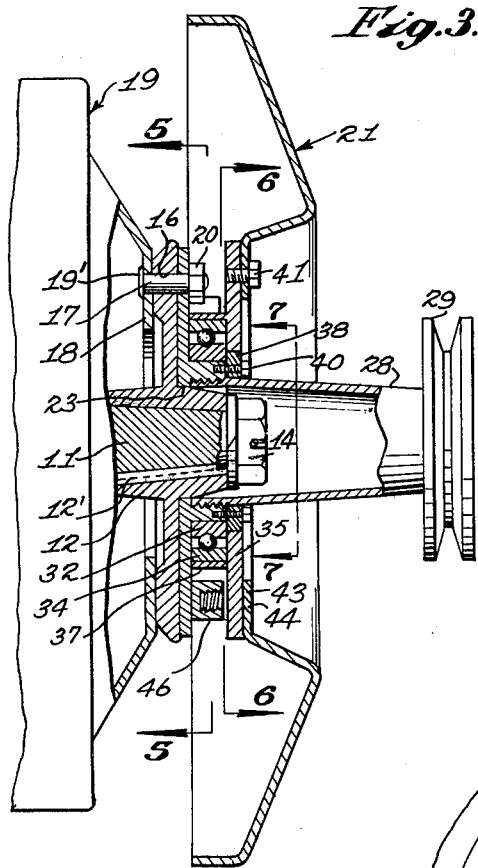
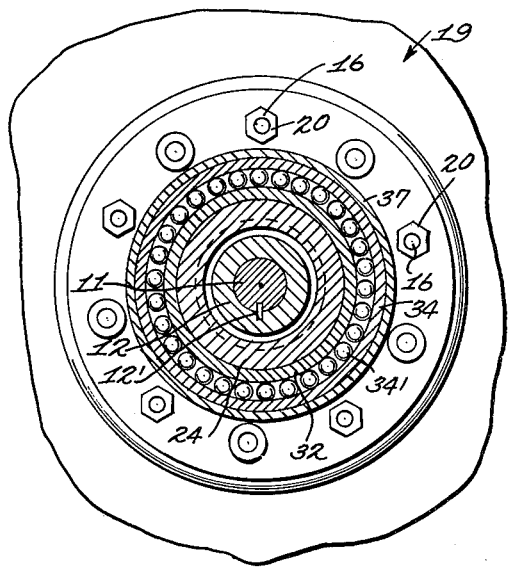
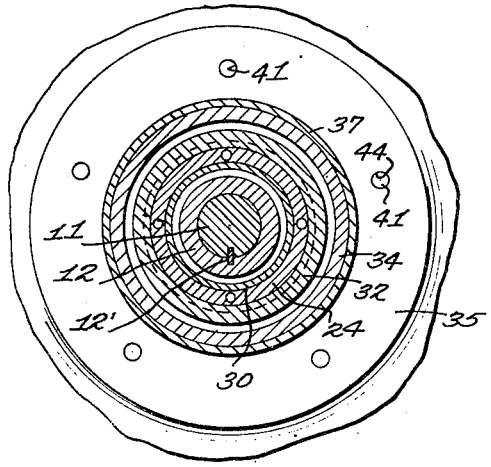
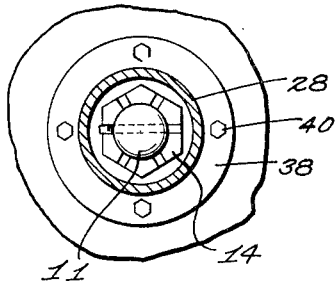
INVENTOR
THOMAS J. TUDOR
BY
McMorrow, Berman + Davidson
ATTORNEYS Patented June 24, 1952

2,601,234

UNITED STATES PATENT OFFICE 2,601,234

AUTOMOBILE DRIVE WHEEL POWER TAKE-OFF

Thomas J. Tudor, Borger, Tex.

Application August 17, 1951, Serial No. 242,257

4 Claims. (Cl. 74—15)

This invention relates to an improved power take-off device for the drive wheels of automobiles of the type rendering unnecessary the jacking up of the automobile while the power take-off is in use, the primary object of the invention being to provide a more efficient and practical device of this character, characterized by a smaller number of simplified and readily assembled parts, together with ease of arrangement of the device for use, and safety in operation.

Other important objects and advantageous features of the invention will be apparent from the following description and the accompanying drawings, wherein, for purposes of illustration only, a specific embodiment of the invention is set forth in detail.

In the drawings:

Figure 1 is a fragmentary edge elevation of an automobile wheel brake drum and drive wheel assembly with which is assembled a power take-off in accordance with the present invention; the wheel being shown in vertical axial section;

Figure 2 is an outboard end elevation of Figure 1;

Figure 3 is a vertical axial section taken on the line 3—3 of Figure 2;

Figure 4 is a view similar to Figure 3 showing the components in axially separated relation;

Figures 5 and 6 are vertical transverse sections, taken on the lines 5—5 and 6—6, respectively, of Figure 3; and Figure 7 is a transverse vertical section taken on the line 7—7 of Figure 3.

Referring in detail to the drawings, wherein like numerals designate like parts throughout the several views, the numeral 10 generally designates a conventional automobile drive wheel brake drum assembly, involving the axle 11, the hub 12 circumposed upon the axle 11 and held thereon by the washer 13 and nut 14, the hub being keyed on the axle at 12′ and having an integral flange 15 pierced at equal circumferentially intervals by bolt holes 16 in which securing bolts 17 are mounted. The securing bolts 17 also traverse the flange 18 of the brake drum 19 which surrounds the hub 12, the brake drum flange 18 being secured against the inboard side of the hub flange 15 by the heads 19′ on the bolts 17 which have nuts 20 on their outboard ends which ordinarily bear against the outboard side of the hub flange 15, the hub flange 15 being provided at intervals between the bolts 17 with threaded holes (not shown) for the reception of lug bolts (not shown) by means of which the wheel disk 21 is mounted on the hub flange 15 in the usual manner.

In accordance with the present invention, instead of the bolts 17 being for securing the wheel disk 21 to the outboard side of the hub flange 15, the bolts 17 are used to secure to the outboard side of the hub flange 15 the power take-off adapter annulus 22, which has a central opening 23 closely receiving the hub 12, and a concentric axial hollow cylindrical or annular member 24 on its outboard side which spacedly surrounds the hub 12 and is internally threaded, as indicated at 25. The outboard or free edge 26 of the member 24 is formed at intervals with threaded bores 27 opening therethrough.

A tubular axle extension 28 having a V-belt pulley 29 on its outboard end, has an externally threaded cylindrical inboard end portion 30 which is arranged to thread into the cylindrical member 24 whereby the axle extension 28 is securely mounted on and for rotation with the adapter 22.

The cylindrical member 24 further serves as the inner holder for the inner race 32 of a ball bearing assembly 33 which includes an outer race 34 with balls 34′ positioned between the races, the ball bearing assembly 33 being preferably secured on the inboard face or side of the wheel disk carrying member 35, which is in the form of a flat annular plate having a central opening 36 sufficiently larger in diameter than the cylindrical member 34 so as to be concentrically spaced from the same in the assembled relation of the parts. An outer annular holder 37 for the outer race 34 of the bearing assembly is secured to the wheel carrying member 35 and surrounds the bearing assembly 33, the bearing assembly being adapted to be circumposed on the cylindrical member 24 in the assembled, operative arrangement of the parts, as shown in Figure 3.

A removable seal and holding ring 38 surrounds the hub 12 and is of a cross section and diameter to fill the space between the opening 36 of the wheel carrying member 35 and the hub 12, and is in abutting relation to the outboard edge 26 of the cylindrical member 24 and flush with the outboard side of the wheel carrying member 35, the ring 38 being removably secured in place by studs 40 traversing the ring and threaded in the bores 27 in the cylindrical member 24. The ring 38 also forcibly abuts the inner race 32 of the ball bearing assembly 33. The wheel disk 21 is removably mounted on the wheel carrying member 35 by means of auxiliary lug bolts 41 which pass through the usual holes 42 provided in the annular mounting flange 43 of the wheel disk 21 and are threaded into holes 44 provided in the wheel carrying member 35, instead of into the usual holes (not shown) which are provided in the hub flange 15.

The wheel carrying member 35, together with the wheel disk 21 are removably assembled to the adapter 22 by means of auxiliary securing bolts 45 traversing the wheel disk flange 43 and the carrying member 35 at points between the auxiliary lug bolts 41. The auxiliary securing bolts 45 thread into bosses 46 fixed on and projecting from the outboard side of the adapter 22.

It will be evident from the foregoing that with the parts assembly as described and the auxiliary securing bolts 45 removed and with two of them replaced by auxiliary lug bolts 41, the tire (not shown) associated with the wheel disk 21 can rest stationarily upon the ground (not shown) and thereby support its associated vehicle in the usual desirable manner, and that the adapter 22 and the pulley equipped axle extension 29 are free to turn relative to the wheel disk as the drive axle 11 is rotated. In view of this, an automobile having its drive wheels equipped in accordance with the present invention need not be jacked up for use and operation of the power take-off arrangement.

It will be understood that changes in the form, composition, and relative arrangement of the component parts as set forth herein are contemplated as comprehended by the scope of the subjoined claims.

I claim:

1. In combination, an automobile drive axle, a brake drum surrounding said axle and secured thereto including a hub flange, an adapter comprising an annular plate surrounding said axle at the outboard side of said hub flange and secured to said hub flange, said annular plate having on its outboard side a hollow cylindrical member surrounding and concentrically spaced from said axle, a tubular axle extension having an inboard end and an outboard end, a pulley fixed on the outboard end of said extension, said inboard end of the extension surrounding said axle and being secured to said hollow cylindrical member for rotation therewith, a wheel disk surrounding said axle extension, a wheel disk carrying annulus surrounding said axle extension and concentrically spaced therefrom, said wheel disk being mounted on said carrying annulus, an annular bearing holder on the inboard side of said carrying annulus concentrically spaced from said hollow cylindrical member, an annular bearing surrounding and circumposed on said cylindrical member and confined between said cylindrical member and said annular bearing holder whereby said carrying annulus and the wheel disk carried thereby are mounted on said adapter for rotation relative thereto and said axle is out of driving relation to said wheel disk but is in supporting relation thereto.

2. In combination, an automobile drive axle, a brake drum surrounding said axle and secured thereto and having a hub flange, and adapter comprising an annular plate surrounding said axle at the outboard side of said hub flange and secured to said hub flange, said annular plate having on its outboard side a hollow cylindrical member surrounding and concentrically spaced from said axle, a tubular axle extension having an inboard end and an outboard end, a pulley fixed on the outboard end of said extension, said inboard end of the extension surrounding said axle and being secured to said hollow cylindrical member for rotation therewith, a wheel disk surrounding said axle extension, a wheel disk carrying annulus surrounding said axle extension and concentrically spaced therefrom, said wheel disk being mounted on said carrying annulus, an annular bearing holder on the inboard side of said carrying annulus concentrically spaced from said hollow cylindrical member, an annular bearing surrounding and circumposed on said cylindrical member and confined between said cylindrical member and said annular bearing holder whereby said carrying annulus and the wheel disk carried thereby are mounted on said adapter for rotation relative thereto and said axle is out of driving relation to said wheel disk but is in supporting relation thereto, said hollow cylindrical member being internally threaded and said inboard end of said axle extension being externally threaded and threadably engaged within said cylindrical member whereby said axle extension is secured to said hollow cylindrical member.

3. In combination, an automobile drive axle, a brake drum surrounding said axle and secured thereto having a hub flange, an adapter comprising an annular plate surrounding said axle at the outboard side of said hub flange and secured to said hub flange, said annular plate having on its outboard side a hollow cylindrical member surrounding and concentrically spaced from said axle, a tubular axle extension having an inboard end and an outboard end, a pulley fixed on the outboard end of said extension, said inboard end of the extension surrounding said axle and being secured to said hollow cylindrical member for rotation therewith, a wheel disk surrounding said axle extension, a wheel disk carrying annulus surrounding said axle extension and concentrically spaced therefrom, said wheel disk being mounted on said carrying annulus, an annular bearing holder on the inboard side of said carrying annulus concentrically spaced from said hollow cylindrical member, an annular bearing surrounding and circumposed on said cylindrical member and confined between said cylindrical member and said annular bearing holder whereby said carrying annulus and the wheel disk carried thereby are mounted on said adapter for rotation relative thereto and said axle is out of driving relation to said wheel disk but is in supporting relation thereto, said wheel disk carrying annulus being formed with circumferentially spaced threaded holes registering with unthreaded holes provided in said wheel disk, and bolt means including auxiliary lug bolts passing through wheel disk holes and threaded into threaded holes of the wheel disk carrying annulus whereby said wheel disk is mounted on said carrying annulus.

4. In combination, an automobile drive axle, a brake drum surrounding said axle and secured thereto having a hub flange, an adapter comprising an annular plate surrounding said axle at the outboard side of said hub flange and secured to said hub flange, said annular plate having on its outboard side a hollow cylindrical member surrounding and concentrically spaced from said axle, a tubular axle extension having an inboard end and an outboard end, a pulley fixed on the outboard end of said extension, said inboard end of the extension surrounding said hub and being secured to said hollow cylindrical member for rotation therewith, a wheel disk surrounding said axle extension, a wheel disk carrying annulus surrounding said axle extension and concentrically spaced therefrom, said wheel disk being mounted on said carrying annulus, an annular bearing holder on the inboard side of said carrying annulus concentrically spaced from said hollow cylindrical member, an annular bearing surrounding and circumposed on said cylindrical member and confined between said cylindrical member and said annular bearing holder whereby said carrying annulus and the wheel disk carried thereby are mounted on said adapter for rotation relative thereto and said axle is out of driving relation to said wheel disk but is in supporting relation thereto, said wheel disk carrying annulus being formed with circumferentially spaced threaded holes registering with unthreaded holes provided in said wheel disk, and bolt means including auxiliary lug bolts passing through wheel disk holes and threaded into threaded holes of the wheel disk carrying annulus whereby said wheel disk is mounted on said carrying annulus, said annular adapted plate having bosses projecting from the outboard side thereof and formed with threaded bores, said bolt means further including auxiliary securing bolts traversing other holes of the wheel disk and other holes in the carrying annulus and threaded in threaded bores of the bosses whereby said carrying annulus is secured against rotating relative to said adapter so as to establish driving relation between said axle and said wheel disk in addition to supporting relation therebetween.

THOMAS J. TUDOR.

No references cited.